Oct. 8, 1957  F. FORSTER  2,808,758
PROJECTION APPARATUS FOR PRODUCING PERSPECTIVE DRAWINGS
Filed Aug. 16, 1955  2 Sheets-Sheet 1
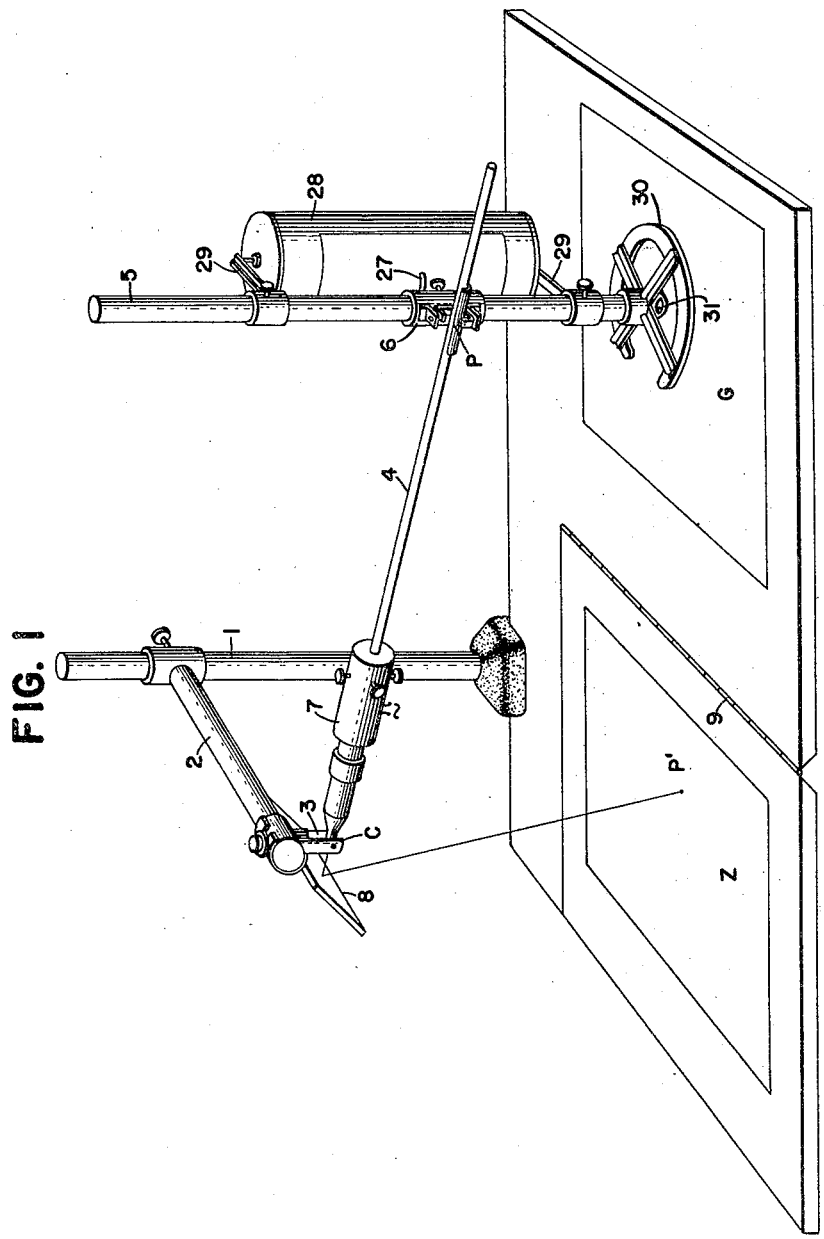
INVENTOR:
FRIDOLIN FORSTER
BY Richardson, David and Nordon
ATTORNEYS.

Oct. 8, 1957 F. FORSTER 2,808,758
PROJECTION APPARATUS FOR PRODUCING PERSPECTIVE DRAWINGS
Filed Aug. 16, 1955 2 Sheets-Sheet 2
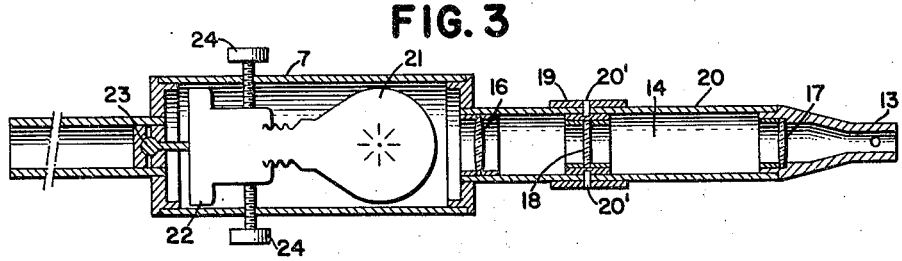
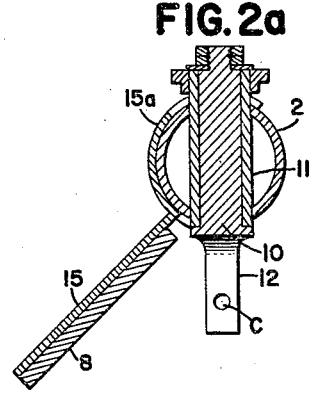
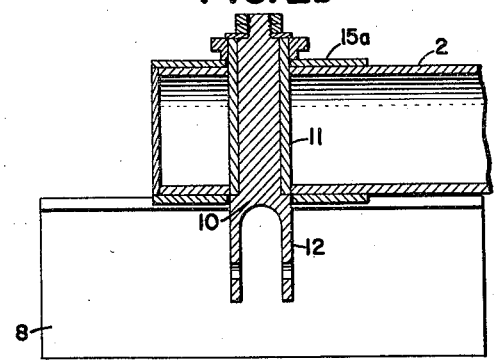
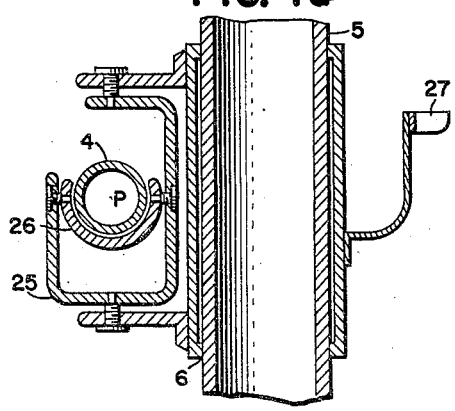
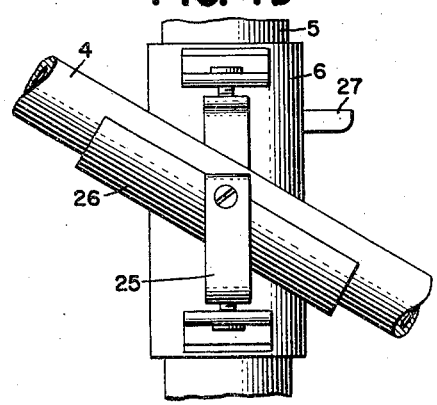
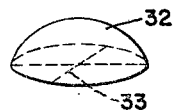
INVENTOR:
FRIDOLIN FORSTER
BY Richardson, Davis and Nordon
ATTORNEYS.

United States Patent Office 2,808,758
Patented Oct. 8, 1957

2,808,758

PROJECTION APPARATUS FOR PRODUCING PERSPECTIVE DRAWINGS

Fridolin Forster, Schaffhausen, Switzerland

Application August 16, 1955, Serial No. 528,777

Claims priority, application Switzerland August 20, 1954

15 Claims. (Cl. 88—24)

The present invention relates to an apparatus for producing perspective drawings from plan view and elevation, and has the primary object of providing an apparatus of this kind which can be operated by any draftsman, without requiring special knowledge of the laws of perspective, in a simple and comfortable way, and with good accuracy.

It is a further object of the invention to provide an apparatus of the kind referred to which allows to vary the scale of the perspective drawing to be produced in a simple manner.

It is yet another object of the invention to provide an apparatus of the kind referred to which allows to produce perspective drawing with vertical parallel lines of an object appearing parallel, or alternatively converging, i. e. with "dropping" lines.

With these and other objects in view I provide an apparatus for producing perspective drawings from plan view and elevation, comprising in combination:—a fixed upright, a member defining the center of projection mounted on the said fixed upright, an upright movable over the plane of the plan view, a slide mounted on the said movable upright adjustably in height to the level of the object point on the elevation, the said member being a universal joint, a rod articulated to the said fixed upright by the said universal joint and guided by the said slide through the object point at the level of the elevation thereof and vertically above the plan view thereof, a source of light mounted on the said rod emitting rays in the direction of the axis of the said rod and passing through the said center of projection, and a mirror mounted on the said fixed upright in the vicinity of the said center of projection, reflecting the said rays on to a plane of drawing and defining thereon by a spot of light the position of the point of the perspective image corresponding to the said object point defined by plan view and elevation.

These and other objects and features of the invention will be clearly understood from the following description of an embodiment thereof given by way of example with reference to the accompanying drawings, in which:

Fig. 1 is a perspective view of a general arrangement of the apparatus according to the invention.

Figs. 2a and b are sections taken at right angles to one another of a universal joint, on a larger scale.

Fig. 3 is a longitudinal section of the source of light on a scale larger than Fig. 1 and smaller than Fig. 2a, b.

Figs. 4a and b are a section and elevation taken at right angles to one another of a double joint, approximately on the same scale as Fig. 3.

Fig. 5 is a perspective view of a plane-convex lens which may be incorporated in the apparatus.

According to Fig. 1 the apparatus has a fixed upright with a column 1 on which the arm 2 is adjustable vertically (and if desired also horizontally). The arm 2 is connected to a rod 4 by a universal joint 3, the centre of which forms the centre of projection C. A movable upright has a column 5 on which a slide is vertically adjustable. The position of the movable upright on the plan view plane G and the height of the slide are adjusted in accordance with the plan view and elevation respectively, for determining the position of a certain object point P. On the slide 6 the rod 4 is guided in a manner to be described later more in detail so that the axis of the rod always connects the centre of projection to the object point adjusted. On the rod a source of light is mounted which is housed in the casing 7. The axis of projection co-incides with the axis of the rod 4, so that the light rays pass consequently through the centre of projection C. These rays are then projected by an inclined mirror 8 on to the plane Z of the drawing, and mark on the same the point P'. This point is then fixed in pencil on the sheet of the drawing, whereafter another object point is adjusted and the corresponding point marked by the rays is fixed, and so forth. In this way a perspective drawing of the object is attained without effort; for it is clear that by the intersection of the bundle of straight lines leading from the centre of projection to the object points with a plane Z a perspective image must be obtained, regardless of whether the bundle of straight lines is deflected by the interposition of a mirror, or not. By the mirror 8, which owing to its short distance from the centre of projection may be quite small, the perspective image is conveniently obtained in any position of the illustration desired and in a convenient position of the sheet of drawing.

When the mirror, which can be turned about a horizontal axis, is inclined 45° to the plane G of the plan view, and when the plane Z of the drawing co-incides therewith as in Fig. 1 the vertical edges of the object appear parallel in the perspective image; the same is correctly orientated as regards sides, and remains so even when the mirror is turned, while the vertical edges of the object will then converge (representation "with dropping lines").

When the mirror is parallel to the plane of the plan view, a birds eye's view is obtained when projecting on to a vertical plane.

Preferably a rest device (not shown) is provided in order to retain the mirror in the two positions of "45°" and of "parallel."

In the apparatus illustrated the plane Z of the drawing can be inclined by the hinge 9 with respect to the plane G of the plan view. Thereby likewise an illustration "with dropping lines" can be attained while maintaining a 45° position of the mirror 8.

In order to vary the scale of the projection, provision could be made, if desired, for adjusting the plane of the drawing in height with respect to the plane of the plan view. The same result is also attained by varying the level of the arm 2 of the fixed upright, if desired.

Fig. 2 (a, b) shows in two projections the universal joint carried by the arm 2 of the upright, and the mounting of the tiltable mirror.

A pin 10 rotatable about its vertical axis is mounted in the tubular arm 2 by means of a bushing 11. In the forked end 12 of the pin 10 the end 13 of the projector device 14 illustrated in Fig. 3 is pivoted about a horizontal axis by means of two short pins (not shown). The point of intersection of the two axes is the centre of projection C. The mirror 8 is fixed to a carrier 15, the curved end 15a of which embraces the arm 2 with a slight clamping action, and is provided with a slot through which the bushing 11 passes.

The projector device 14 illustrated in Fig. 3 comprises a condenser lens 16 and a projector lens 17, between which there is a glass plate 18 provided with a central marking. This marking is projected by the projector lens on to the plane of the drawing. For the purpose of focussing, the glass plate is shiftable in the axial direction. Therefore a knurled ring 19 with two pins 20' is provided which are guided in the usual manner in two oblique slots (not visible in the drawing) of the tube 20.

For the illumination a lamp 21 is provided the diagrammatically indicated fitting 22 of which is provided with a ball joint 23. By the aid of four adjustment screws 24, of which two only are visible in the drawing, the lamp can accordingly easily be centred in the correct position.

Fig. 4 (a, b) shows the double joint mounted on the slide 6 and having an outer member 25 and an inner member 26 which consists of a longitudinally halved tube. In this half-tube slides the likewise tubular rod 4. In order to assure a smooth and noiseless sliding of the rod 4 in the half-tube 26, the inner surface of the latter is preferably lined with felt. The rod may consist, if desired, of several parts fitted together in order to adapt their lengths to the desired distance of the plan view from the centre of projection.

On the slide 6 a horizontal pointer 27 is fixed which is curved co-axially to the hollow cylinder 28 (Fig. 1). On this hollow cylinder the elevation drawing is mounted, and by means of the pointer 27 the slide is adjusted at any time to the level corresponding to the object point contemplated. The hollow cylinder is mounted on the free ends of an arm 29 of the movable upright, rotatably about its vertical axis. In order to prevent any toppling over of the upright, the hollow cylinder has to be as light as possible; it may be composed e. g. of thin wooden veneers by gluing. The foot of the movable upright consists substantially of a metal ring 30 which need not be fully closed if desired. The underside of the metal ring has a convex underside in order that it may slide as easily as possible over the plan view drawing. The ring consists preferably of light metal and is chromium plated at its underside for better slidability. A glass plate 31 is provided with a marking which is to be adjusted accurately to the plan view of the object point. This marking is located accurately below the centre of the double joint which represents the object point P.

Instead of a glass plate a plane-convex lens 32 could be provided, the flat underside of which would then be provided with the marking 33 (Fig. 5). Alternatively the whole foot of the movable upright could be made of a transparent material in order to leave the plan view visible everywhere.

Instead of arranging a projector apparatus in the path of the rays, merely a diaphragm could be arranged having a small central diaphragm aperture. However, in this case a very strong source of light is required.

In case it should be desired to turn the perspective image 90°, a pentagon prism of the usual kind could be arranged between the centre of projection C and the mirror in such a manner that it turns the rays 90° in a horizontal plane; the perspective image is then correctly orientated, but turned 90° in the Z-plane.

If desired a dark chamber, say of pyramid shape, could be provided, into the bottom of which a photo-sensitive paper can be inserted and fixed in the Z-plane. The mirror 8 would have to be in the interior of the chamber which accordingly would not end on top in a pointed apex; the chamber would only need a small aperture on top, as near as possible to the centre of projection C for the entry of the marking rays. By means of such a chamber a perspective image could be drawn without having to mark the individual points in accordance with the light marks, and then to connect these points.

While I have herein described and illustrated in the accompanying drawings what may be considered a typical and particularly useful embodiment of my said invention, I wish it to be understood that I do not limit myself to the particular details and dimensions shown and described, for obvious modifications will occur to a person skilled in the art.

What I claim as my invention and desire to secure by Letters Patent is:

1. An apparatus for producing perspective drawings from plan view and elevation positioned at right angles to each other, comprising in combination: a fixed upright, a member defining the center of projection mounted on the said fixed upright, a movable upright movable over the plane of the plan view, a slide mounted on the said movable upright adjustably in height to the level of the object point on the elevation, the said member being a universal joint, a rod articulated to the said fixed upright by the said universal joint and guided by the said slide through the object point at the level of the elevation thereof and vertically above the plan view thereof, a light beam projector having a source of light mounted on the said rod and emitting light beam rays in the direction of the axis of the said rod and passing through the said center of projection and a mirror mounted on the said fixed upright in the vicinity of the said center of projection reflecting the said light beam rays on to a plane of drawing and defining thereon by a spot of light the position of the point of the perspective image corresponding to the said object point defined by plan view and elevation.

2. An apparatus as claimed in claim 1 comprising a double joint having an outer member articulated to the said slide and an inner member articulated to the said outer member about an axis intersecting the axis of articulation of the said outer member, the said inner member being constituted by a tube halved longitudinally, the said rod being guided in the said inner member in its axial direction.

3. An apparatus as claimed in claim 1, comprising a projector device including a condenser lens, a glass plate provided with a central marking, and a projector lens, the said projector device being arranged on the said rod in the path of the light rays from the said source of light to the said mirror.

4. An apparatus as claimed in claim 1, comprising a hollow cylinder mounted rotatably about its vertical axis and adjustably in height on the said movable upright, the elevation being mounted on the circumference of the said cylinder.

5. An apparatus as claimed in claim 1, comprising a hollow cylinder mounted with its axis vertical on the said movable upright rotatably and adjustably in height, a horizontal pointer curved co-axially to the said cylinder mounted on the said slide, the said cylinder carrying the elevation mounted on its circumference, and the said pointer being adjusted to the object point envisaged on the said elevation.

6. An apparatus as claimed in claim 1, comprising a horizontal arm fixed to the said fixed upright, the said mirror being pivoted on the said arm about a horizontal axis.

7. An apparatus as claimed in claim 1, comprising a horizontal arm fixed to the said fixed upright, the said mirror being pivoted on the said arm about an axis parallel to the plane of the plan view, and an arrester device mounted on the said arm adapted to retain the said mirror in two alternative positions, the said mirror being in one of these positions parallel to the plane of the plan view, and in the other position including an angle of 45° with the same.

8. An apparatus as claimed in claim 1, comprising a fitting for the said light source, a ball joint articulating said fitting to the said rod, and set-screws laterally adjusting the position of the said fitting with respect to the said rod.

9. An apparatus as claimed in claim 1, wherein the said movable upright comprises a foot consisting of a metal ring having a convex underside.

10. An apparatus as claimed in claim 1, wherein the said movable upright comprises a foot having a transparent member with a marking adjustable to the object point on the plan view, a slide vertically adjustable on the said upright, a double joint having intersecting axes articulating the said rod slidably in the longitudinal direction thereof to the said movable upright, the said marking on the said transparent member being arranged vertically below the intersecting point of the axes of the said double joint.

11. An apparatus as claimed in claim 1, comprising a slide vertically adjustable on the said movable upright, a double joint having intersecting axes articulating the said rod slidably in the longitudinal direction thereof to the said slide, and a plane-convex lens provided on its flat underside with a marking, the said lens being attached to the said movable upright with the said marking disposed vertically below the intersecting point of the axes of the said double joint.

12. An apparatus as claimed in claim 1, comprising a plate, carrying the perspective drawing to be produced, arranged tiltably with respect to the plane of the said plan view.

13. An apparatus as claimed in claim 1, comprising a plate, carrying the perspective drawing to be produced, arranged adjustably in height with respect to the plane of the said plan view.

14. An apparatus as claimed in claim 1, comprising arm vertically adjustable on the said fixed upright, the said universal joint being attached to the said arm.

15. An apparatus as claimed in claim 1, wherein the said rod comprises several lengths adapted to be fitted into one another in alignment with each other.

References Cited in the file of this patent

UNITED STATES PATENTS

| | | |
|---|---|---|
| 1,791,604 | Reardon | Feb. 10, 1931 |
| 2,017,292 | Porter | Oct. 15, 1935 |
| 2,072,286 | Wellington | Mar. 2, 1937 |
| 2,116,217 | Schwarz | May 3, 1938 |
| 2,143,011 | De Juhasz | Jan. 10, 1939 |
| 2,214,682 | Spacher | Sept. 10, 1940 |
| 2,261,201 | Wilson | Nov. 4, 1941 |
| 2,357,542 | Pfeil | Sept. 5, 1944 |
| 2,372,494 | Hogan et al. | Mar. 27, 1945 |
| 2,661,653 | Castiglia | Dec. 8, 1953 |
| 2,693,129 | Nistri | Nov. 2, 1954 |